United States Patent [19]
Hirota et al.

[11] Patent Number: 5,941,067
[45] Date of Patent: Aug. 24, 1999

[54] EXHAUST GAS PURIFICATION DEVICE FOR AN ENGINE

[75] Inventors: Shinya Hirota; Tatsuji Mizuno; Kazuya Kibe, all of Susono, Japan

[73] Assignees: Toyota Jidosha Kabushiki Kaisha, Aichi-ken; Denso Corporation, Aichi-Pref., both of Japan

[21] Appl. No.: 08/951,783

[22] Filed: Oct. 16, 1997

[30] Foreign Application Priority Data

Oct. 23, 1996 [JP] Japan .................................. 8-280882

[51] Int. Cl.$^6$ ...................................................... F01N 3/00
[52] U.S. Cl. ................................ 60/286; 60/274; 60/277; 60/285; 60/303
[58] Field of Search ........................... 60/274, 277, 285, 60/286, 300, 303

[56] References Cited

U.S. PATENT DOCUMENTS

| | | | |
|---|---|---|---|
| 5,133,184 | 7/1992 | Geiger ........................................ | 60/274 |
| 5,428,956 | 7/1995 | Maus et al. ................................ | 60/277 |
| 5,617,720 | 4/1997 | Achleitner et al. ....................... | 60/274 |
| 5,706,652 | 1/1998 | Sultan ....................................... | 60/274 |

FOREIGN PATENT DOCUMENTS 63-283727  11/1988  Japan .
 8158859   6/1996  Japan .

OTHER PUBLICATIONS

U.S. Application No. 08/861,292, filed May 21, 1997.

*Primary Examiner*—F. Daniel Lopez
*Assistant Examiner*—Binh Tran
*Attorney, Agent, or Firm*—Kenyon & Kenyon

[57] ABSTRACT

An exhaust gas purification device, for an engine having an exhaust passage, said device comprising a catalyst arranged in the exhaust passage for purifying $NO_x$ with a reducing agent. A purification ratio of the $NO_x$ by said catalyst becomes more than a predetermined ratio when a temperature of said catalyst is within a predetermined temperature range. A predetermined amount of a reducing agent is fed to said catalyst. An amount of the reducing agent to be fed is increased with respect to the predetermined amount when a temperature of an upstream end of the catalyst is lower than a lowest value of the predetermined temperature range and a temperature of a downstream end of the catalyst is higher than the lowest value.

18 Claims, 9 Drawing Sheets

EXHAUST GAS PURIFICATION DEVICE FOR AN ENGINE

BACKGROUND OF THE INVENTION

1. Field of the Invention

The invention relates to an exhaust gas purification device for an engine.

2. Description of the Related Art

An exhaust gas purification device for an engine is known. The device comprises a catalyst arranged in an exhaust passage for purifying $NO_x$ in an exhaust gas. The catalyst reduces the $NO_x$ with HC (hydrocarbon) to $N_2$ to purify the $NO_x$ at a ratio higher than a predetermined ratio when a temperature of the catalyst is within a predetermined temperature range. Therefore, it is preferable to maintain the temperature of the catalyst within the predetermined temperature range in order to purify the $NO_x$ at high ratio.

In an exhaust gas purification device for an engine disclosed in Japanese Patent Publication No. 63-283727, HC is fed into an exhaust gas when an amount of HC is not sufficient to purify $NO_x$.

The $NO_x$ in the exhaust gas includes NO and $NO_2$. Generally, the HC activated in the catalyst can easily reduce the $NO_2$ to $N_2$ while the activated HC cannot easily reduce the NO to $N_2$. In order to purify the NO, it is necessary to oxidize NO with $O_2$ in the exhaust gas to $NO_2$, and thereafter, the $NO_2$ is reduced with the HC to the $N_2$.

However, the NO cannot easily be oxidized with $O_2$ to $NO_2$ when the temperature of the catalyst is within the predetermined temperature range since, in the catalyst, a reducing reaction is easily carried out.

SUMMARY OF THE INVENTION

Accordingly, the object of the invention is to provide an exhaust gas purification device for an engine, the device being able to purify NO in the exhaust gas.

According to the present invention, there is provided an exhaust gas purification device for an engine having an exhaust passage, the device comprising: a catalyst arranged in the exhaust passage for purifying $NO_x$ with reducing agent, a purification ratio of the $NO_x$ by the catalyst becoming more than a predetermined ratio when a temperature of the catalyst is within a predetermined temperature range; feeding means for feeding a predetermined amount of a reducing agent to the catalyst; and increasing means for increasing an amount of the reducing agent to be fed with respect to the predetermined amount when a temperature of an upstream end of the catalyst is lower than a lowest value of the predetermined temperature range and a temperature of a downstream end of the catalyst is higher than the lowest value.

Further, according to the present invention, temperature control means is provided for controlling a temperature of the catalyst to make the temperature of the upstream end of the catalyst a temperature lower than the lowest value of the predetermined temperature range and make the temperature of the downstream end of the catalyst a temperature higher than the lowest value.

Further, according to the present invention, there is provided an exhaust gas purification device for an engine having an exhaust passage, the device comprising: a catalyst arranged in the exhaust passage for purifying $NO_x$ with reducing agent, a purification ratio of the $NO_x$ by the catalyst becoming more than a predetermined ratio when a temperature of the catalyst is within a predetermined temperature range; feeding means for feeding a reducing agent to the catalyst; and temperature control means for controlling a temperature of the catalyst to make the temperature of the upstream end of the catalyst a temperature lower than the lowest value of the predetermined temperature range and make the temperature of the downstream end of the catalyst a temperature higher than the lowest value.

Further, according to the present invention, the feeding means feeds a reducing agent to the catalyst when a temperature of an upstream end of the catalyst is lower than a lowest value of the predetermined temperature range and a temperature of a downstream end of the catalyst is higher than the lowest value and stops feeding a reducing agent to the catalyst when at least the temperature of the upstream end of the catalyst is higher than the lowest value of the predetermined temperature range.

Further, according to the present invention, cooling means is provided for cooling the upstream end of the catalyst, heating means is provided for heating the downstream end of the catalyst, and the temperature control means controls the cooling means and the heating means to make the temperature of the upstream end of the catalyst a temperature lower than the lowest value of the predetermined temperature range and make the temperature of the downstream end of the catalyst a temperature higher than the lowest value.

Further, according to the present invention, the predetermined ratio is higher than about 25 percent.

Further, according to the present invention, the predetermined ratio is higher than about 35 percent.

Further, according to the present invention, the cooling means cools the upstream end of the catalyst by air.

Further, according to the present invention, the cooling means cools the upstream end of the catalyst by water.

Further, according to the present invention, the cooling means is arranged within the upstream end of the catalyst.

Further, according to the present invention, the heating means is arranged within the downstream end of the catalyst.

The present invention may be more fully understood from the description of the preferred embodiments of the invention set forth below, together with the accompanying drawings.

DESCRIPTION OF THE PREFERRED EMBODIMENTS

Figure 1:
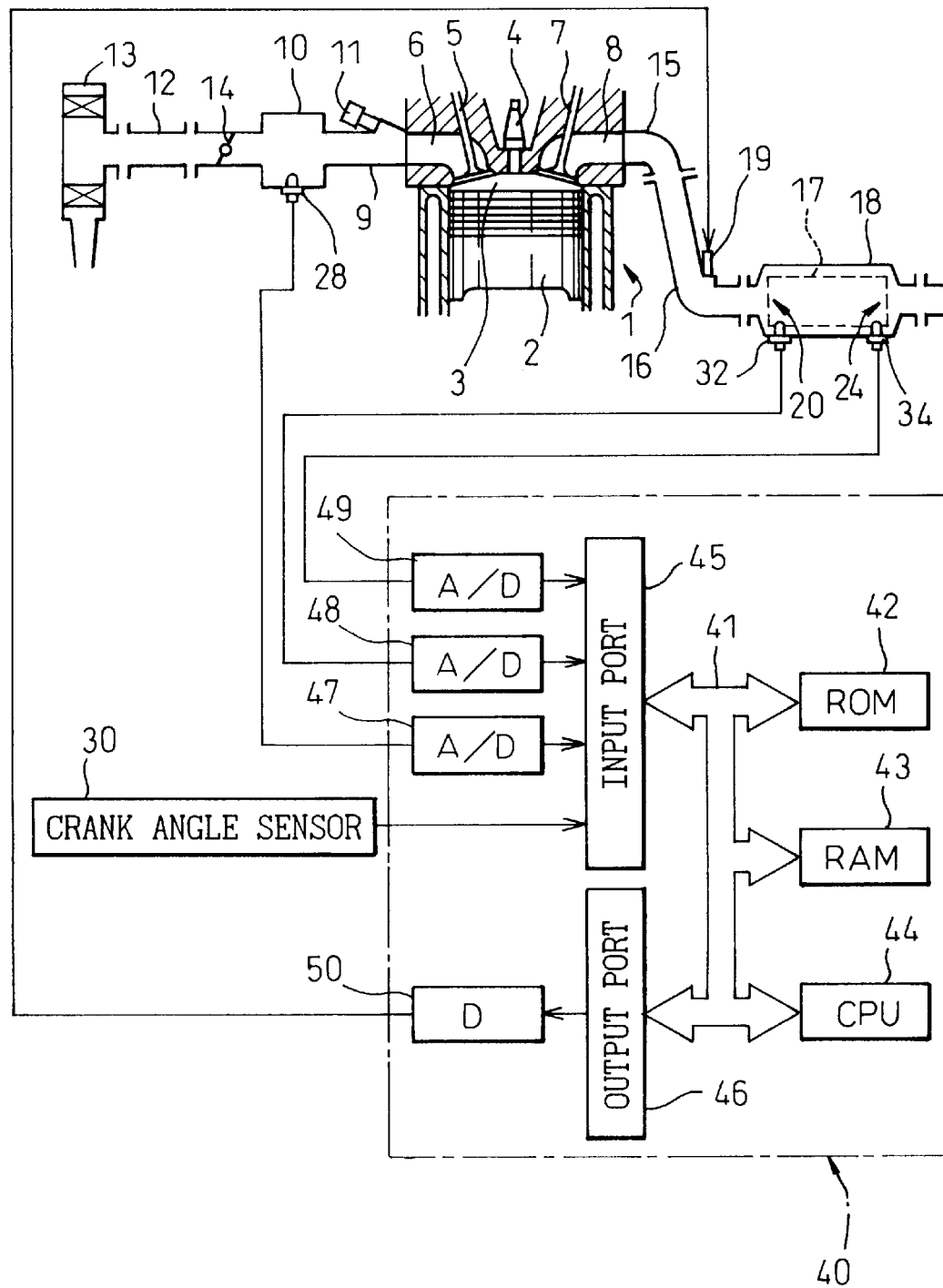
FIG. 1 is a view of an exhaust gas purification device for an engine according to a first embodiment.

The invention will be understood from following description referring to the drawings. Referring to FIG. 1 showing an exhaust gas purification device for an engine according to a first embodiment, a reference number 1 is an engine body, 3 is a combustion chamber provided in the engine body 1, 2 is a piston positioned in the combustion chamber 3, 4 is an ignition plug, 5 is an intake valve, 6 is an intake port, 7 is an exhaust valve, and 8 is an exhaust port. The intake port 6 is connected to a surge tank 10 via a corresponding intake manifold 9. A pressure sensor 28 is arranged in the surge tank 10 to measure a pressure in the surge tank 10. Each intake manifold 9 is provided with a fuel injector 11 for injecting fuel toward the intake port 6. The surge tank 10 is connected to an air cleaner 13 via an intake duct 12. A throttle valve 14 is arranged in the intake duct 12.

The exhaust port 8 is connected to an exhaust passage or pipe 16 via an exhaust manifold 15. A $NO_x$ catalyst 17 for purifying $NO_x$ in the exhaust gas, incorporated in a casing 18, is arranged in the exhaust pipe 16. In a purification reaction in the catalyst 17, within a predetermined temperature range of the catalyst 17, a HC is adsorbed on the catalyst 17 to be changed into an activated HC, and the activated HC reacts with the $NO_x$ in the exhaust gas to purify $NO_x$. An upstream temperature sensor 32 is arranged in an upstream end 20 of the catalyst 17 to measure an upstream catalyst temperature of the upstream end 20 of the catalyst 17. A downstream temperature sensor 34 is arranged in a downstream end 24 of the catalyst 17 to measure a downstream catalyst temperature of the downstream end 24 of the catalyst 17.

A hydrocarbon (HC) feeding valve 19 is arranged in the exhaust pipe 16 upstream of the catalyst 17 to feed a reducing agent, i.e., HC to the catalyst 17. In this specification, the words "upstream" and "downstream" are used as a direction in the flow direction of an exhaust gas.

The present invention can be applied to an engine which discharges an exhaust gas including a large amount of $O_2$, such as a compression-ignition combustion engine, or a lean-burn engine.

An electronic control unit (ECU) 40 has a digital computer and comprises a read only memory (ROM) 42, a random access memory (RAM) 43, a central processing unit 44 (CPU), an input port 45 and an output port 46.

The pressure sensor 28 is input into the input port 45 via a corresponding A-D converter 47. The upstream temperature sensor 20 is input into the input port 45 via a corresponding A-D converter 48. The downstream temperature sensor 34 is input into the input port 45 via a corresponding A-D converter 49. The engine comprises a crank angle sensor 30 to generate an output signal every 30 degree of a crank shaft (not shown) of the engine body 1. The crank angle sensor 30 is directly input into the input port 45. Engine speed is calculated on the basis of the output signal of the crank angle sensor 30.

The output port 46 is connected to the HC feeding valve 19 via a drive 50.

Figure 2:
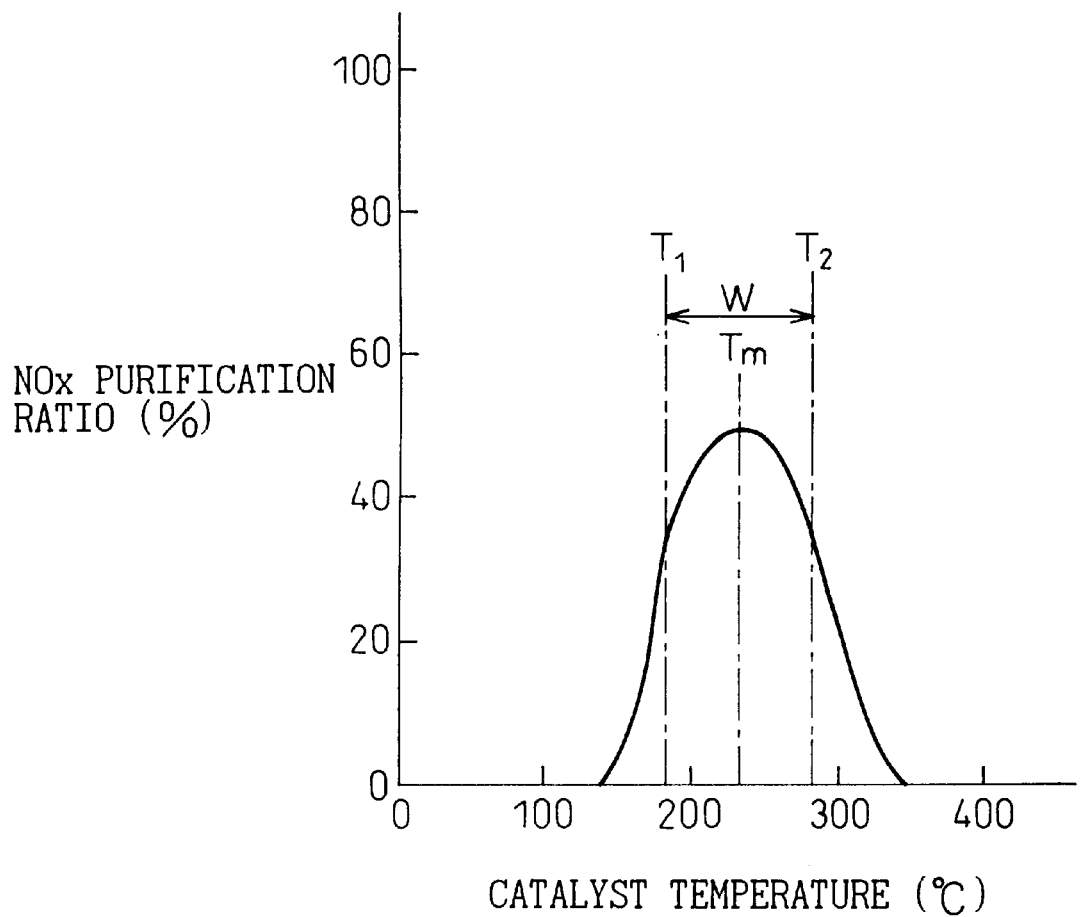
FIG. 2 is a view of a relationship between catalyst temperature and $NO_x$ purification ratio.

The catalyst 17 purifies $NO_x$ at a ratio higher than a predetermined ratio when the catalyst temperature is within a predetermined temperature range. Referring to FIG. 2, the predetermined temperature range W of the first embodiment is between a lowest temperature or value $T_1$ and an highest temperature or value $T_2$. The purification ratio of the catalyst 17 is higher than half of the highest purification ratio of the catalyst 17, i.e., in the first embodiment, higher than about 25 percent when the catalyst temperature is within the predetermined temperature range W. Preferably, the purification ratio of the catalyst 17 is higher than about 35 percent when the catalyst temperature is within the predetermined temperature range W.

The lowest temperature $T_1$ is lower than a suitable temperature Tm. The catalyst 17 purifies $NO_x$ at the highest ratio when the catalyst temperature is at the suitable temperature Tm. The highest temperature $T_2$ is higher than the lowest temperature $T_1$. Preferably, the highest temperature $T_2$ is higher than the suitable temperature Tm.

According to the first embodiment, the HC feeding valve 19 is opened for a first predetermined opening period $tv_1$ to feed a first amount $M_1$ of HC to the catalyst 17 when the catalyst temperature is in a first condition $C_1$ where the upstream catalyst temperature TU is lower than the lowest temperature $T_1$ of the predetermined temperature range W and the downstream catalyst temperature TD is equal to or higher than the lowest temperature $T_1$ of the predetermined temperature range W. The first amount $M_1$ of the HC fed in the first condition $C_1$ reacts with $NO_x$ for a first period $t_1$ to purify the same.

On the other hand, the HC feeding valve 19 is opened for a second predetermined opening period $tv_2$ to feed a second amount $M_2$ of HC to the catalyst 17 when the catalyst temperature is in a second condition $C_2$ where the upstream catalyst temperature TU is within the predetermined temperature range W or where the upstream catalyst temperature TU is higher than the highest temperature $T_2$ and the downstream catalyst temperature TD is lower than the highest temperature $T_2$ when the upstream temperature TU is higher than the highest temperature $T_2$ and the downstream temperature TD is higher than the highest temperature $T_2$, the HC feeding valve 19 is closed until the catalyst temperature becomes the first or second condition $C_1$ or $C_2$. Further, when the upstream temperature TU is lower than the lowest temperature $T_1$ and the downstream temperature TD is lower than the lowest temperature $T_2$, the HC feeding valve 19 is closed until the catalyst temperature becomes the first or second condition $C_1$ or $C_2$. The second amount $M_2$ of the HC fed in the second condition $C_2$ reacts with $NO_x$ for a second period $t_2$ to purify the same.

In the first embodiment, the first period $t_1$ is larger than the second period $t_2$, and the first amount $M_1$ is larger than the second amount $M_2$. A measurement of the catalyst temperature is performed immediately before the first period $t_1$ or the second period $t_2$ is passed. Then, the amount of HC to be fed to the catalyst 17 is determined on the basis of the catalyst temperature.

Figure 3:
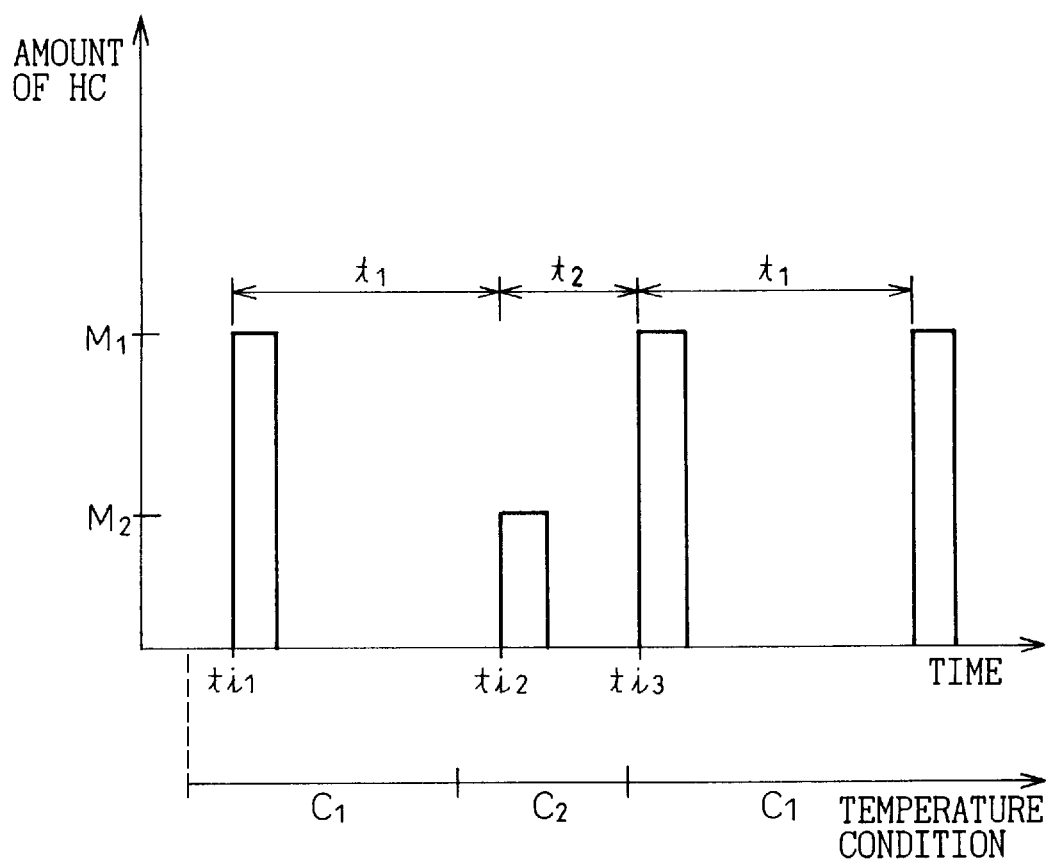
FIG. 3 is a view of a relationship between time, an amount of HC and temperature condition of a catalyst.

A feeding control according to the first embodiment will be explained below, referring to FIG. 3. A catalyst temperature is measured at a time $t_1$-α immediately before a feeding timing $ti_1$. Since the catalyst temperature is in the first condition $C_1$, the first amount $M_1$ of the HC is fed to the catalyst 17. The factor α is an infinitesimal time. Then, a catalyst temperature is measured at a time $t_2$-α immediately before a feeding timing $ti_2$. The feeding timing $ti_2$ is the time when the first period time $t_1$ has passed. Since the catalyst temperature is in the second condition $C_2$, the second amount $M_2$ of the HC is fed to the catalyst 17. Further, a catalyst temperature is measured at a time $t_3$-α immediately before a feeding timing $ti_3$. The feeding timing $ti_3$ is the time when the second period time $t_2$ has passed. Since the catalyst temperature is in the first condition $C_1$, the first amount $M_1$ of the HC is fed to the catalyst 17. According to the above process, an amount of HC to be fed to the catalyst 17 is determined.

The amount of the HC to be fed to the catalyst 17 is determined on the basis of an amount of $NO_x$ in the exhaust gas. The amount of the $NO_x$ in the exhaust gas is estimated below. As the engine speed N increases, the amount of the exhaust gas discharged per unit time from the engine increases. Therefore, as the engine speed N increases, the amount of the $NO_x$ discharged per unit time from the engine increases.

Figure 4:
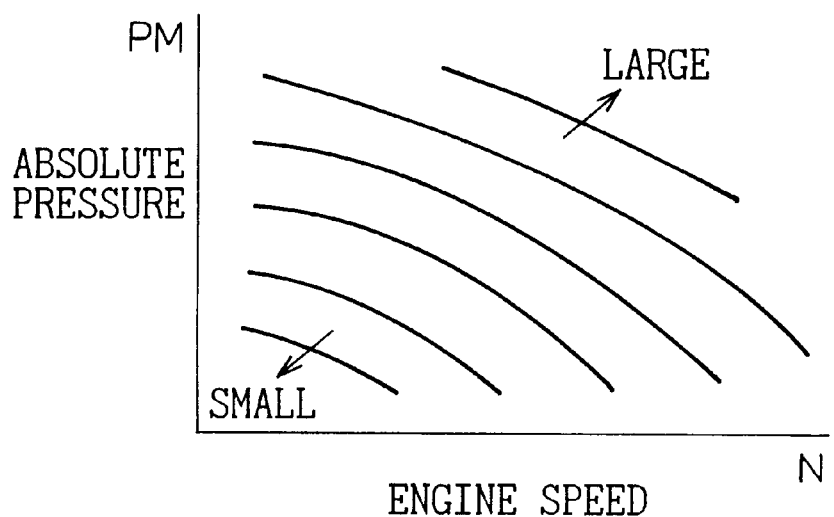
FIG. 4 is a view of a relationship between engine speed, absolute pressure and an amount of $NO_x$ discharged from the engine.
Figure 5:
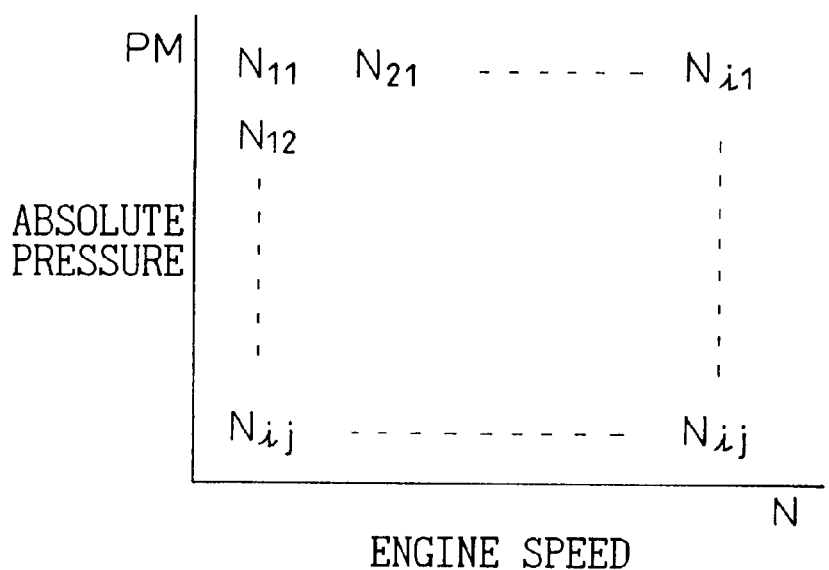
FIG. 5 is a view of a map storing the amount of the $NO_x$ discharged from the engine on the basis of the engine speed and the absolute pressure.

Further, as the engine load increases, the absolute pressure PM in the surge tank 10 and the combustion temperature in the combustion chambers increase. Therefore, as the engine load increases, the amount of the exhaust gas i.e., the amount of the $NO_x$ discharged per unit time from the engine, increases. FIG. 4 shows a relationship, obtained by experiment, between the amount of the $NO_x$ discharged per unit time from the engine, the absolute pressure PM in the surge tank 10, and the engine speed N. In FIG. 4, each curve shows the same amount of the $NO_x$. Referring to FIG. 4, the amount of the $NO_x$ discharged per unit time from the engine increases as the absolute pressure PM in the surge tank 10 or the engine speed N increases. The data shown in FIG. 4 is stored in the ROM 42 in the form of a map shown in FIG. 5.

The amount of the HC fed to the catalyst 17 at one injecting operation is determined in such a manner that most of the HC can react with $NO_x$ in the catalyst 17.

Figure 6:
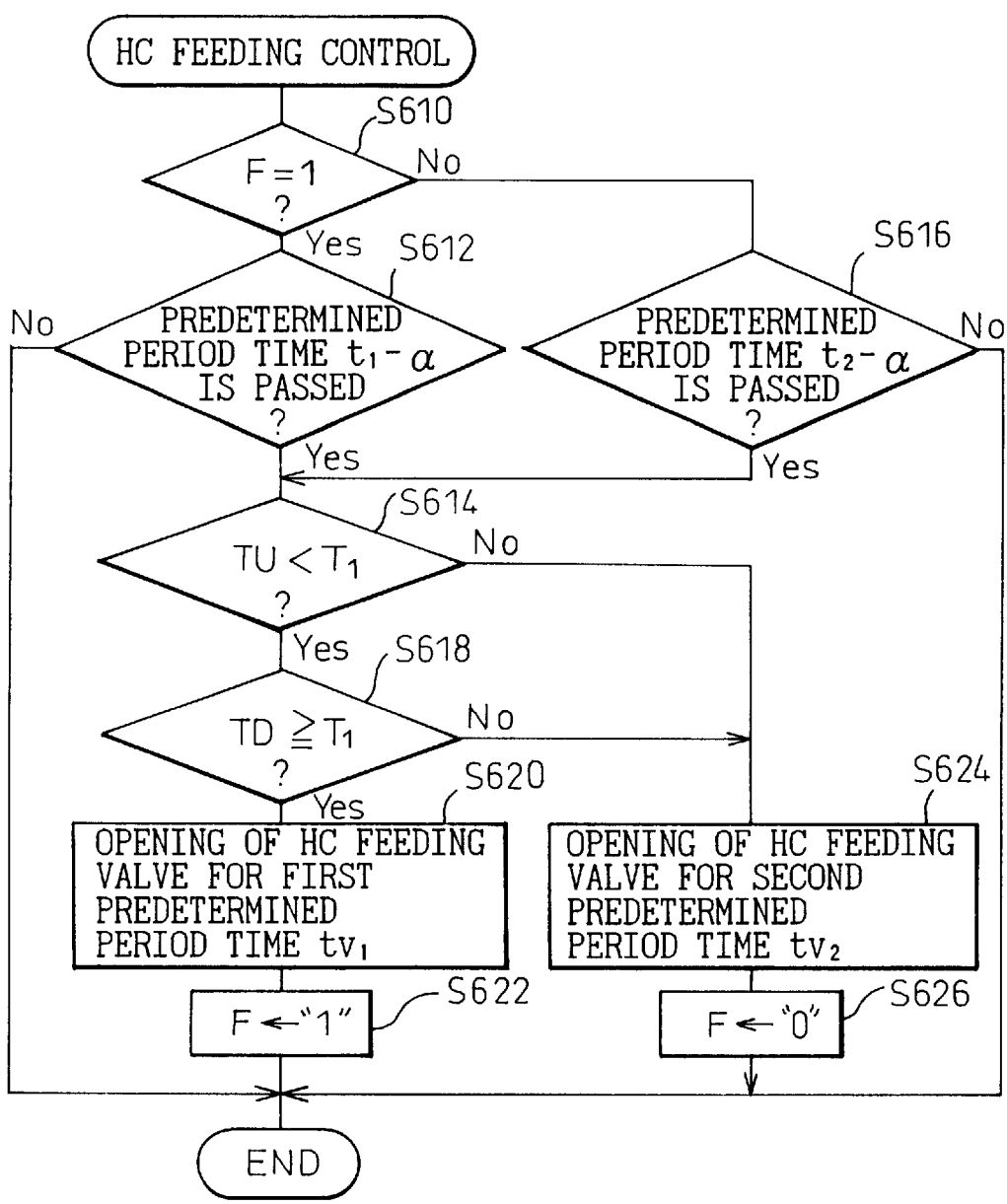
FIG. 6 is a view of a flowchart of a HC feeding control according to the first embodiment.

FIG. 6 shows a flowchart of a HC feeding control according to the first embodiment. At step 610, it is judged if a flag F is "1" (F=1). When F=1, the routine proceeds to step 612. On the other hand, when F 1, the routine proceeds to step 616.

At step 612, it is judged if a time $t_1$-α has passed. When the time $t_1$-α has passed, the routine proceeds to step 614. On the other hand, when the time $t_1$-α has not passed, the processing cycle is ended.

At step 616, it is judged if a time $t_2$-α has passed. When the time $t_2$-α has passed, the routine proceeds to step 614. On the other hand, when the time $t_2$-α has not passed, the processing cycle is ended.

At step 614, it is judged if the upstream catalyst temperature TU is lower than the lowest temperature $T_1$ of the predetermined temperature range W (TU<$T_1$). When TU<$T_1$, the routine proceeds to step 618. On the other hand, when TU≧$T_1$, the routine proceeds to step 624, where the HC feeding valve is opened for a second predetermined period $tv_2$, and then the routine proceeds to step 626, where "0" is input into the flag F, and the processing cycle is ended.

At step 618, it is judged if the downstream catalyst temperature TD is equal to or higher than the lowest temperature $T_1$ of the predetermined temperature range W (TD≧$T_1$). When TD≧$T_1$, the routine proceeds to step 620, where the HC feeding valve is opened for a first predetermined period $tv_1$, and then the routine proceeds to step 622, where "1" is input into the flag F, and the processing cycle is ended. When TD<$T_1$, the routine proceeds to the step 624, where the HC feeding valve is opened for the second predetermined period $tv_2$, and then the routine proceeds to step 626, where "0" is input into the flag F, and the processing cycle is ended.

According to the first embodiment, the HC fed to the catalyst 17 at the first condition $C_1$ can hardly react with $NO_x$ at the upstream end 20 of the catalyst 17 since the upstream catalyst temperature is lower than the lowest temperature of the predetermined temperature range W and therefore the HC is not activated or gaseous around the catalytic metal carried on the catalyst 17. The substantial amount of the HC can hardly perform the reducing reaction with $NO_2$ and $O_2$ in the exhaust gas and is adsorbed on the upstream end 20 of the catalyst 17. Further, a density of the $O_2$ in the exhaust gas is kept high level since the HC does not reduce the $O_2$. Therefore, NO in the exhaust gas is oxidized to $NO_2$ by the $O_2$ in the exhaust gas around the upstream end 20 of the catalyst 17.

The HC adsorbed on the upstream end 20 of the catalyst 17 moves toward the downstream end 24 of the catalyst 17 along the flow direction of the exhaust gas. The HC can reduce $NO_2$ including $NO_2$ reduced at the upstream end 20 of the catalyst 17, to $N_2$ at a portion of the catalyst 17, the temperature of which is within the predetermined temperature range W.

The above reaction is continued for the first predetermined period $t_1$. According to the first embodiment, the NO in the exhaust gas can be purified, and the purification ratio of the catalyst 17 is kept at a high level.

On the other hand, the HC fed to the catalyst 17 at the second condition $C_2$ reacts with $NO_x$ at the purification ratio generally equal to that of the prior catalyst.

Figure 7:
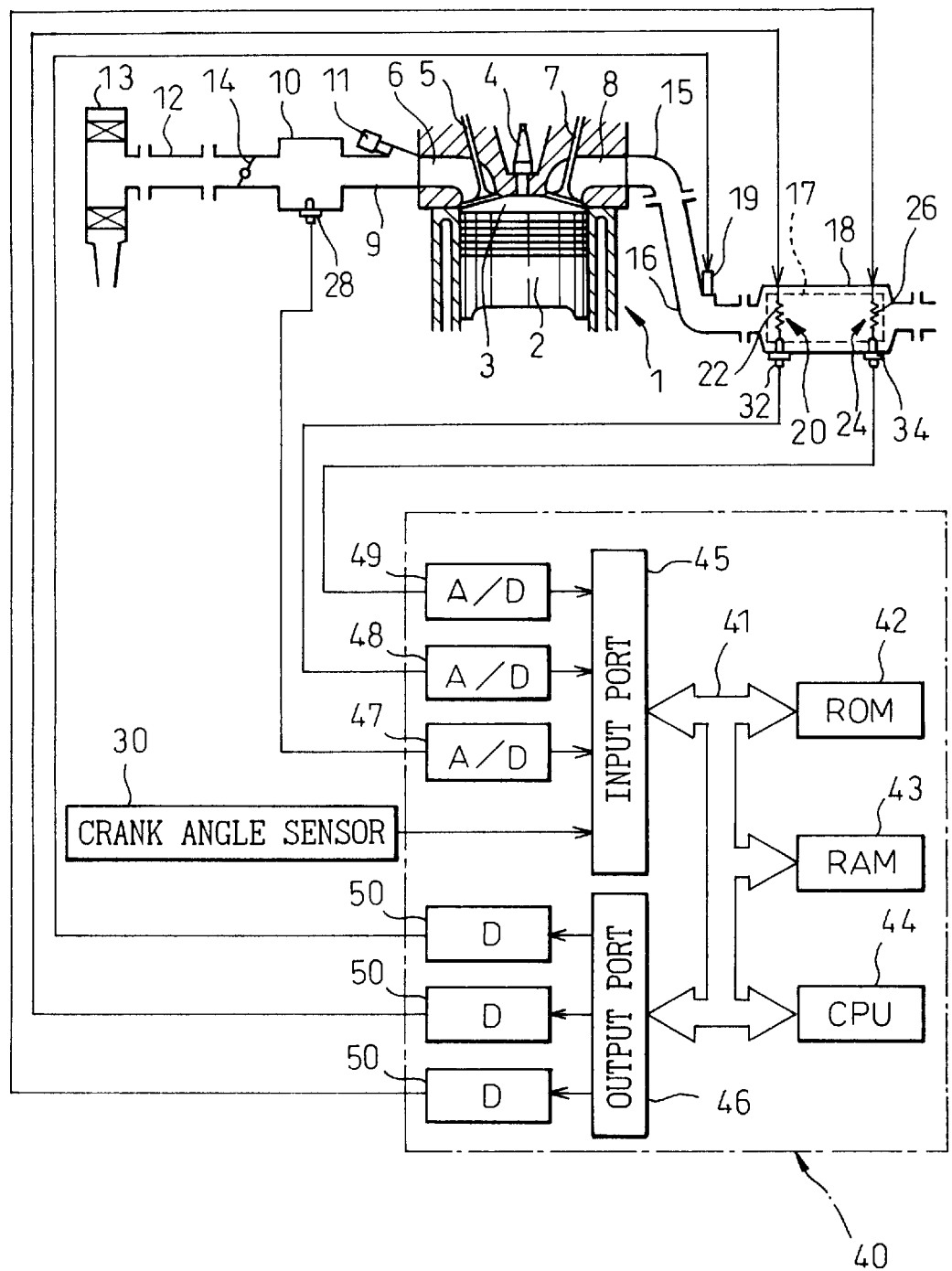
FIG. 7 is a view of an exhaust gas purification device of an engine according to a second embodiment.

FIG. 7 shows the exhaust gas purification device of the engine according to a second embodiment. According to the second embodiment, a cooling device 22 as cooling means is arranged within the upstream end 20 of the catalyst 17 to cool the upstream end 20 of the catalyst 17. Further, a heating device 26 as heating means is arranged within the downstream end 24 of the catalyst 17 to heat the downstream end of the catalyst 17. The cooling device 22 may cool the upstream end of the catalyst 17 by air or water. The heating device 26 may be electric heater.

The components of the second embodiment of the device other than those described above are the same as in the first embodiment of the device.

Figure 8:
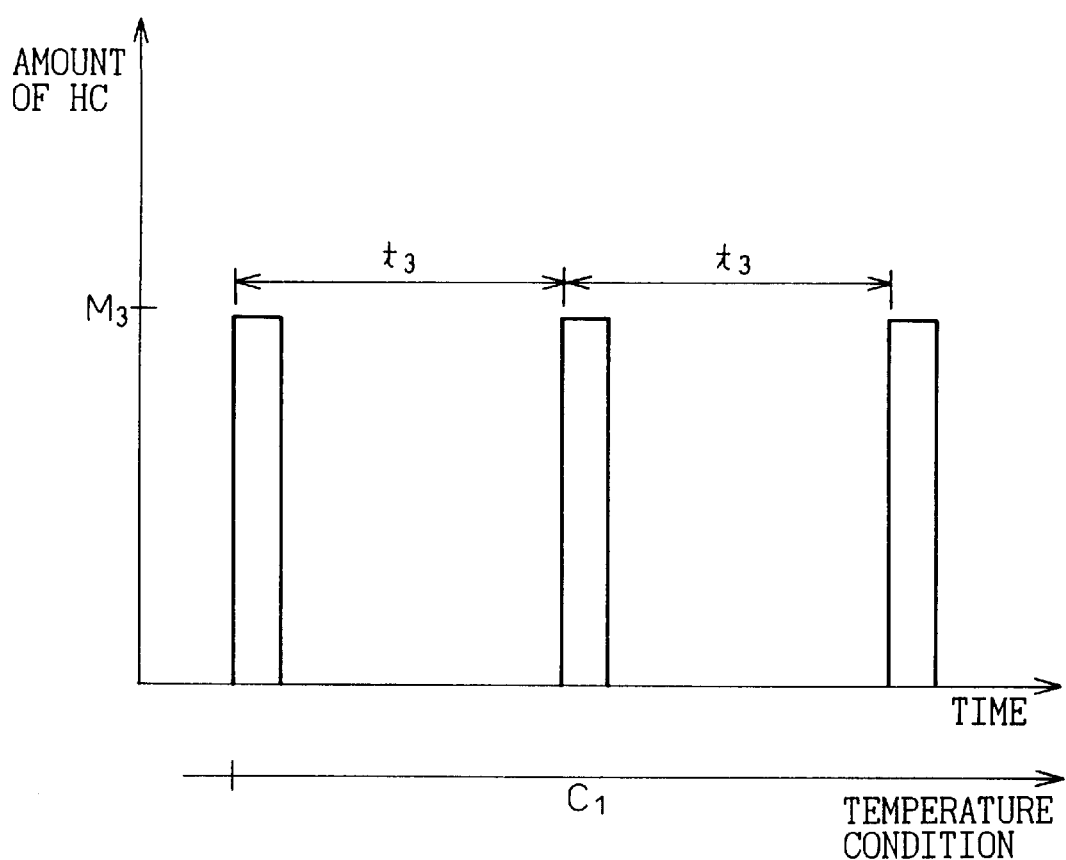
FIG. 8 is a view of a relationship between time, an amount of HC and temperature condition of a catalyst.

A feeding control according to the second embodiment will be explained below, referring to FIG. 8. A catalyst temperature is measured at a time $t_1$-α immediately before a feeding timing $ti_1$. When the catalyst temperature is in the first condition $C_1$, the third amount $M_3$ of the HC is fed to the catalyst 17. On the other hand, when the catalyst temperature is not in the first condition $C_1$, the HC feeding valve 19 is stopped to feed HC to the catalyst 17 and the cooling and heating devices 22 and 26 are activated so that the upstream catalyst temperature is lower than the lowest temperature $T_1$ of the predetermined temperature range W and the downstream catalyst temperature is equal to or higher than the lowest temperature $T_1$ in the predetermined temperature range W.

The third amount $M_3$ of the HC fed to the catalyst 17 at one injecting operation is determined in such a manner that most of the HC can react with $NO_x$ in the catalyst 17. Further, the third amount $M_3$ of the HC is set so that the upstream catalyst temperature is kept lower than the lowest temperature $T_1$ of the predetermined temperature range W by a cooling effect of HC.

Figure 9:
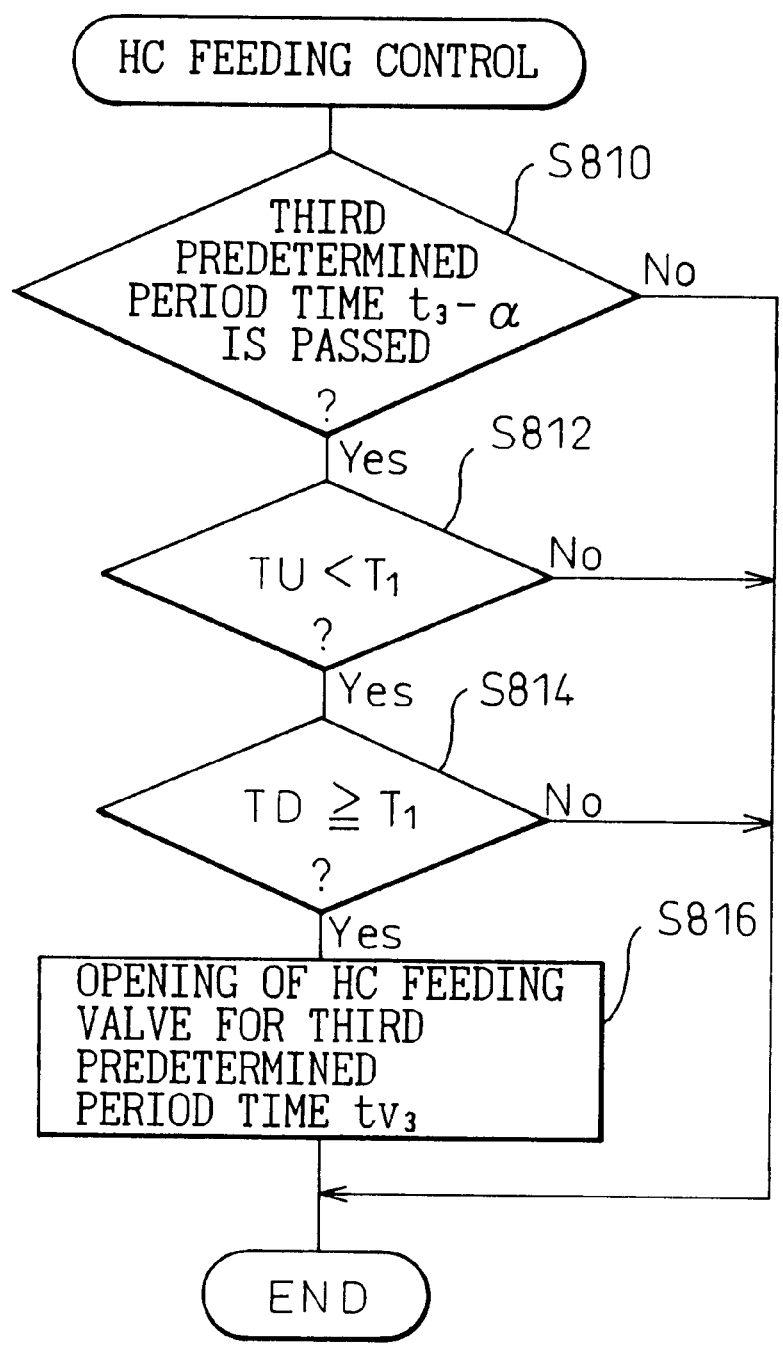
FIG. 9 is a view of a flowchart of a HC feeding control according to the second embodiment.

FIG. 9 shows a flowchart of a HC feeding control according to the second embodiment. At step 810, it is judged if the time $t_3-\alpha$ has passed. When the time $t_3-\alpha$ has passed, the routine proceeds to step 812. On the other hand, when the time $t_3-\alpha$ has not passed, the processing cycle is ended.

At step 812, it is judged if the upstream catalyst temperature TU is lower than the lowest temperature $T_1$ of the predetermined temperature range W (TU<$T_1$). When TU<$T_1$, the routine proceeds to step 814. On the other hand when TU$\geq T_1$, the processing cycle is ended.

At step 814, it is judged if the downstream catalyst temperature TD is equal to or higher than the lowest temperature $T_1$ of the predetermined temperature range W (TD$\geq T_1$). When TD$\geq T_1$, the routine proceeds to step 816, where the HC feeding valve is opened for a third predetermined period $tv_3$, and the processing cycle is ended. On the other hand, when TD<$T_1$, the processing cycle is ended.

Figure 10:
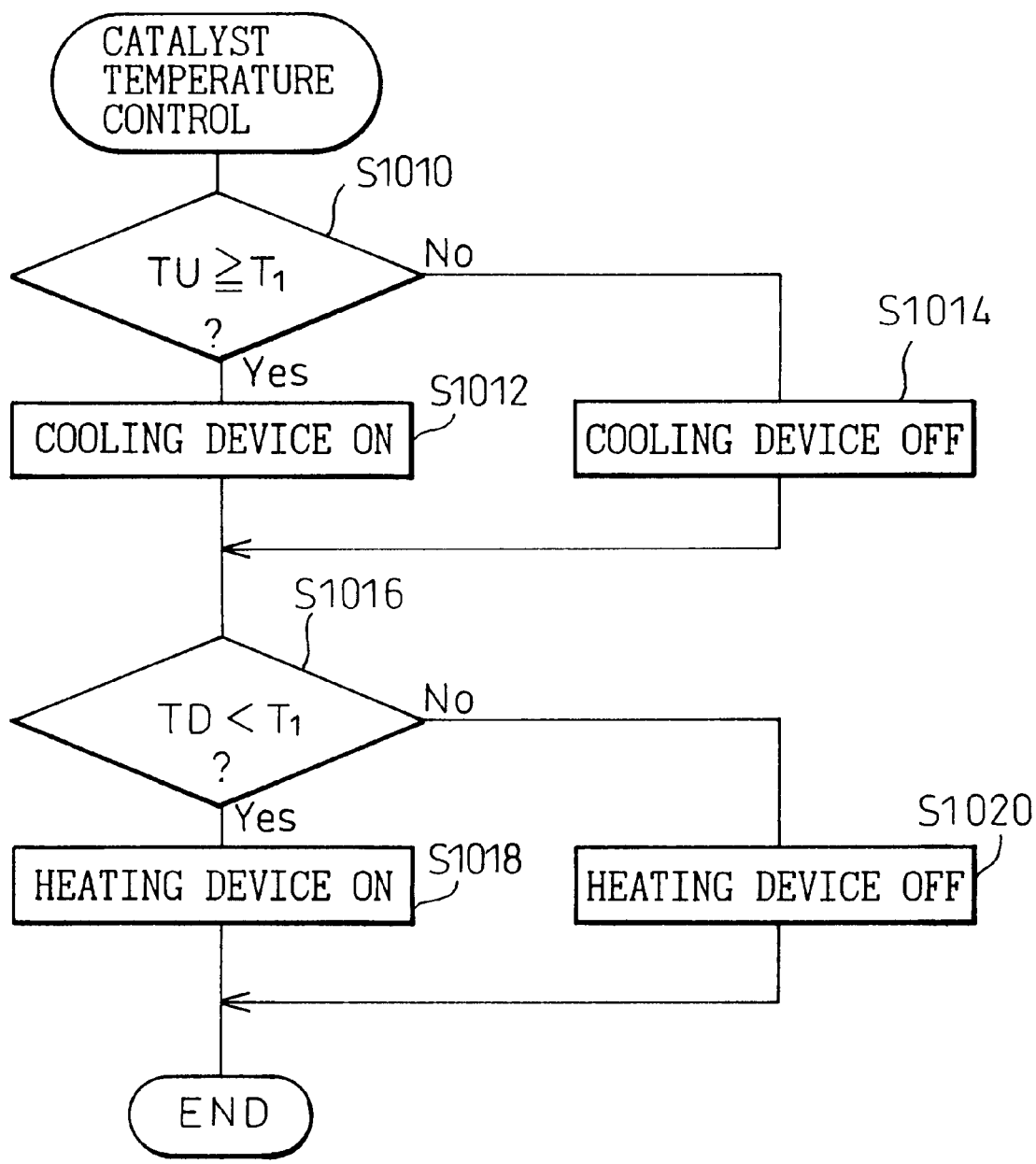
FIG. 10 is a view of a flowchart of a catalyst temperature control according to the second embodiment.

FIG. 10 shows a flowchart of a catalyst temperature control according to the second embodiment. At step 1010, it is judged if the upstream catalyst temperature TU is equal to or higher than the lowest temperature $T_1$ of the predetermined temperature range W (TU$\geq T_1$). When TU$\geq T_1$, the routine proceeds to step 1012, where the cooling device is switched on, and the routine proceeds to step 1016. On the other hand, when TU<$T_1$, the routine proceeds to step 1014, where the cooling device 22 is switched off, and the routine proceeds to step 1016.

At step 1016, it is judged if the downstream catalyst temperature TD is lower than the lowest temperature $T_1$ of the predetermined temperature range W (TD<$T_1$). When TD<$T_1$, the routine proceeds to step 1018, where the heating device 26 is switched on, and the processing cycle is ended. On the other hand, when TD$\geq T_1$, the routine proceeds to step 1020, where the heating device 26 is switched off, and the processing cycle is ended.

It should be noted that the HC feeding control according to the first embodiment can be applied to the exhaust gas purification device according to the second embodiment. Further, the invention may be applied to a catalyst in that $NO_x$ is adsorbed in the catalyst in an atmosphere including an excess amount of $O_2$, and the adsorbed $NO_x$ is discharged from the catalyst to react with HC in an atmosphere including HC sufficient to purify $NO_x$.

While the invention has been described by reference to specific embodiments chosen for purposes of illustration, it should be apparent that numerous modifications can be made thereto by those skilled in the art without departing from the basic concept and scope of the invention.

We claim:

1. An exhaust gas purification device of an engine having an exhaust passage, said device comprising:

a catalyst arranged in the exhaust passage for purifying $NO_x$ with reducing agent, a purification ratio of the $NO_x$ by said catalyst becoming more than a predetermined ratio when a temperature of said catalyst is within a predetermined temperature range;

feeding means for feeding a predetermined amount of a reducing agent to said catalyst; and increasing means for increasing an amount of the reducing agent to be fed with respect to said predetermined amount when a temperature of an upstream end of the catalyst is lower than a lowest value of said predetermined temperature range and a temperature of a downstream end of the catalyst is higher than the lowest value.

2. An exhaust gas purification device according to claim 1, wherein temperature control means is provided for controlling a temperature of said catalyst to make the temperature of the upstream end of the catalyst a temperature lower than the lowest value of the predetermined temperature range and make the temperature of the downstream end of the catalyst a temperature higher than the lowest value.

3. An exhaust gas purification device according to claim 2, wherein cooling means is provided for cooling the upstream end of the catalyst, heating means is provided for heating the downstream end of the catalyst, and said temperature control means controls said cooling means and said heating means to make the temperature of the upstream end of the catalyst a temperature lower than the lowest value of the predetermined temperature range and make the temperature of the downstream end of the catalyst a temperature higher than the lowest value.

4. An exhaust gas purification device according to claim 1, wherein the predetermined ratio is higher than about 25 percent.

5. An exhaust gas purification device according to claim 4, wherein the predetermined ratio is higher than about 35 percent.

6. An exhaust gas purification device according to claim 3, wherein said cooling means cools the upstream end of the catalyst by air.

7. An exhaust gas purification device according to claim 3, wherein said cooling means cools the upstream end of the catalyst by water.

8. An exhaust gas purification device according to claim 3, wherein said cooling means is arranged within the upstream end of the catalyst.

9. An exhaust gas purification device according to claim 3, wherein said heating means is arranged within the downstream end of the catalyst.

10. An exhaust gas purification device of an engine having an exhaust passage, said device comprising:

a catalyst arranged in the exhaust passage for purifying $NO_x$ with a reducing agent, a purification ratio of the $NO_x$ by said catalyst becoming more than a predetermined ratio when a temperature of said catalyst is within a predetermined temperature range;

feeding means for feeding a reducing agent to said catalyst; and temperature control means for controlling a temperature of the catalyst to make the temperature of the upstream end of the catalyst a temperature lower than the lowest value of the predetermined temperature range and make the temperature of the downstream end of the catalyst a temperature higher than the lowest value.

11. An exhaust gas purification device according to claim 10, wherein said feeding means feeds a reducing agent to said catalyst when a temperature of an upstream end of the catalyst is lower than a lowest value of the predetermined temperature range and a temperature of a downstream end of the catalyst is higher than the lowest value and stops feeding a reducing agent to said catalyst when at least the temperature of the upstream end of the catalyst is higher than the lowest value of the predetermined temperature range.

12. An exhaust gas purification device according to claim 10, wherein cooling means is provided for cooling the upstream end of the catalyst, heating means is provided for heating the downstream end of the catalyst, and said temperature control means controls said cooling means and said heating means to make the temperature of the upstream end of the catalyst a temperature lower than the lowest value of the predetermined temperature range and make the temperature of the downstream end of the catalyst a temperature higher than the lowest value.

13. An exhaust gas purification device according to claim 10, wherein the predetermined ratio is higher than about 25 percent.

14. An exhaust gas purification device according to claim 13, wherein the predetermined ratio is higher than about 35 percent.

15. An exhaust gas purification device according to claim 12, wherein said cooling means cools the upstream end of the catalyst by air.

16. An exhaust gas purification device according to claim 12, wherein said cooling means cools the upstream end of the catalyst by water.

17. An exhaust gas purification device according to claim 12, wherein said cooling means is arranged within the upstream end of the catalyst.

18. An exhaust gas purification device according to claim 12, wherein said heating means is arranged within the downstream end of the catalyst.

* * * * *